United States Patent
Lei et al.

(10) Patent No.: US 8,119,585 B2
(45) Date of Patent: Feb. 21, 2012

(54) LIQUID NONIONIC SURFACTANTS FOR EMULSION POLYMERIZATION AND OTHER APPLICATIONS

(75) Inventors: Xiaoping Lei, Cotteridge (GB); John Adamson, Kidderminster (GB); David Ross, Tervuren (BE)

(73) Assignee: Huntsman International LLC, The Woodlands, TX (US)

( * ) Notice: Subject to any disclaimer, the term of this patent is extended or adjusted under 35 U.S.C. 154(b) by 305 days.

(21) Appl. No.: 12/094,747

(22) PCT Filed: Nov. 28, 2006

(86) PCT No.: PCT/US2006/045623
§ 371 (c)(1),
(2), (4) Date: May 22, 2008

(87) PCT Pub. No.: WO2007/064673
PCT Pub. Date: Jun. 7, 2007

(65) Prior Publication Data
US 2008/0293914 A1    Nov. 27, 2008

Related U.S. Application Data

(60) Provisional application No. 60/740,980, filed on Nov. 30, 2005.

(51) Int. Cl.
*C11D 1/72*  (2006.01)
*C11D 3/32*  (2006.01)

(52) U.S. Cl. ......... 510/421; 510/433; 510/499; 510/505

(58) Field of Classification Search .................. 510/421, 510/433, 499, 505
See application file for complete search history.

(56) References Cited

U.S. PATENT DOCUMENTS

| 5,346,973 A | 9/1994 | Feustel et al. |
| 5,364,552 A * | 11/1994 | Merz et al. ............ 510/340 |
| 2004/0068050 A1 | 4/2004 | Miller et al. |
| 2004/0260017 A1 * | 12/2004 | Mertens et al. ............ 524/832 |

FOREIGN PATENT DOCUMENTS

| WO | WO 96/22341 | * | 7/1996 |
| WO | WO 03/035702 | * | 5/2003 |

* cited by examiner

*Primary Examiner* — Brian P Mruk

(57) ABSTRACT

The present invention provides a high actives liquid nonionic surfactant concentrate that includes a fatty alcohol alkoxylate having an alkylene oxide content of about 10-100 moles and at least one other nonionic surfactant alkoxylate having an alkylene oxide content of about 4-12 moles. The liquid surfactant concentrate may be utilized in a variety of applications, such as emulsion polymerization or in the formulation of agrochemical compositions.

16 Claims, No Drawings

LIQUID NONIONIC SURFACTANTS FOR EMULSION POLYMERIZATION AND OTHER APPLICATIONS

CROSS-REFERENCE TO RELATED APPLICATION

This application is the National Phase of International Application PCT/US2006/045623 filed Nov. 28, 2006 which designated the U.S. and which claims priority to U.S. Provisional Application No. 60/740,980 filed on Nov. 30, 2005. The noted applications are incorporated herein by reference.

STATEMENT REGARDING FEDERALLY SPONSORED RESEARCH OR DEVELOPMENT

Not Applicable.

FIELD OF THE INVENTION

The present invention is directed to high active liquid nonionic surfactant concentrates containing (i) a fatty alcohol alkoxylate and (ii) at least one other nonionic surfactant alkoxylate and its use in various applications including emulsion polymerization.

BACKGROUND OF THE INVENTION

The emulsion polymerization of ethylenically unsaturated monomers has long been utilized to form solid polymeric particles that are intended for a variety of end uses. One type of nonionic surfactant useful as an emulsifier in the emulsion polymerization and stabilization of the formed latex is an alkylphenol ethoxylate (APE). However, because of environmental concerns and regulations, there is a growing trend to move away from the use of APE's in emulsion polymerization as well as in other applications. Known APE replacements are generally either less cost effective, less versatile, provide inferior performance, are supplied as low active solutions, or are solids or flakes which are difficult to handle. For example, U.S. Pat. No. 5,346,973 describes a mixture of an ethoxylated linear fatty alcohol and an ethoxylated alkyl 1,2-diol. However, ethoxylated alkyl 1,2-diol is relatively difficult to manufacture compared to the ingredients of the present invention. In addition, U.S. Pat. No. 5,364,552 describes an aqueous mixture containing a linear fatty ethoxylate, a fatty alcohol ethoxylate and propoxylate, and a branched alcohol ethoxylate. However, this aqueous mixture is limited to an average degree of alkoxylation of at most 8. Therefore, it would be desirable to provide an APE replacement having surface activities comparable to APE which can be easily manufactured, is cost effective, readily biodegradable and provided as an aqueous solution for easy use.

SUMMARY OF THE INVENTION

The present invention provides a surfactant system comprising (i) a fatty alcohol alkoxylate having alkylene oxide contents ranging from about 10 to about 100 moles and (ii) one or more nonionic surfactant alkoxylates having alkylene oxide contents ranging from about 4 to about 12 moles. The surfactant system can be incorporated into a liquid surfactant concentrate containing a high actives content of greater than 30% by weight based on the total weight of surfactant concentrate. The high actives liquid surfactant concentrate can be used in a variety of settings such as an emulsifier either in the emulsion polymerization of unsaturated monomers or in agrochemical formulations, or as a dispersion aid for textiles, or as an agent in household or industrial cleaning compositions.

DETAILED DESCRIPTION OF THE INVENTION

The present invention relates to a mixture containing a fatty alcohol alkoxylate and one or more nonionic surfactant alkoxylates. It has been surprisingly found that when the fatty alcohol alkoxylate and nonionic surfactant alkoxylate are combined, a surfactant system is produced which may be further incorporated into a high actives liquid surfactant concentrate for use in a variety of settings. By "high actives" it is to be understood that the surfactant concentrate contains greater than 30% by wt. surfactant, and in some instances, up to 90% by wt. surfactant, based on the total weight of the surfactant concentrate. Moreover, even though the surfactant concentrate is a high actives surfactant concentrate, it is a liquid solution at room temperature and will therefore maintain the ability to be easily poured. In addition, the high actives liquid surfactant concentrate can be easily manufactured by simply blending commercially available components together. Finally, the high actives surfactant concentrate of the present invention is readily biodegradable and can therefore be used as a highly effective replacement for alkylphenol ethoxylate.

Surfactant System

As a first essential component, the surfactant system of the present invention includes a primary or secondary fatty alcohol alkoxylate of the general formula (I):

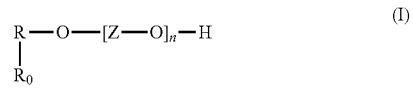

where R is a linear or branched, saturated or unsaturated, hydrocarbon group having from about 6 to about 24 carbon atoms; $R_0$ is the same as R or hydrogen; Z is an alkylene group having 2 to 4 carbon atoms; and n is the alkylene oxide content ranging from about 10 to about 100 moles.

Generally, R is a linear fatty hydrocarbon residue having from about 6 to about 24 carbon atoms. Examples of such R groups include, but are not limited to, octyl ($C_8$), decyl ($C_{10}$), lauryl ($C_{12}$), myristyl ($C_{14}$), cetyl ($C_{16}$), stearyl ($C_{18}$), oleyl and mixtures thereof. The R group may originate from any animal, natural or synthetic source including, but not limited to, coconut oil, palm oil, tallow, soybean oil, linseed oil and hydrogenated products thereof.

In formula (I) above, Z is preferably an ethylene or propylene group. If desired, ethylene and propylene groups can both be added such that substantially uniform blocks or random occurring moieties of ethylene oxide and propylene oxide are produced in the fatty alcohol alkoxylate. When a block arrangement is utilized, there generally is a single block derived from ethylene oxide and a single block derived from propylene oxide. However, if desired, a plurality of smaller blocks may be utilized in producing the fatty alcohol alkoxylate. In one embodiment, at least half of the Z's are ethylene groups. In another embodiment, all of the Z's are ethylene groups.

The alkylene oxide content n may vary depending on the fatty hydrocarbon residue chosen for use but will generally be greater than about 10 but no more than about 100 moles. In one embodiment, n may range from about 12 to about 70 moles for the fatty alcohol alkoxylate. In another embodiment, n may range from about 30 to about 60 moles for the fatty alcohol alkoxylate.

The fatty alcohol alkoxylates of formula (I) may be derived by well known methods, such as, by the alkoxylation of an appropriate alcohol, such as Ziegler, Guerbet, Oxo or natural alcohol of varying chain length and containing alkyl chain distributions ranging from about 6 to about 24 carbon atoms. Examples of appropriate alcohols include commercially available alcohols such as NAFOL® and SAFOL® (Sasol Ltd.), NEODOL® (Shell), LOROL® (Henkel Corporation), etc. The appropriate alcohol may then be reacted with propylene oxide and/or ethylene oxide in the presence of a base catalyst, such as sodium hydroxide, potassium hydroxide or sodium methoxide, or by narrow range alkalization technologies.

As a second essential component, the surfactant system includes one or more nonionic surfactant alkoxylates. The nonionic surfactant alkoxylate may be an alkyl monoalkanolamide alkoxylate having the following formula (II):

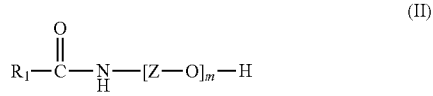

or an alkyl dialkanolamide alkoxylate having the following formula (III):

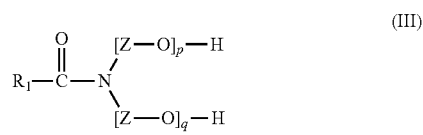

where $R_1$ is a fatty acid hydrocarbon chain containing from about 5 to about 21 carbon atoms, Z has the same meaning as above and m and p+q are the alkylene oxide contents ranging from about 4 to about 12 moles.

The alkyl mono- and dialkanolamide alkoxylates may be obtained by first reacting alkanolamines such as monoethanolamine, diethanolamine, monoisopropanolamine, or diisopropanolamine, with a fatty acid or fatty acid ester to form an amide and then subsequently alkoxylating the amide with an alkylene oxide, such as ethylene oxide and/or propylene oxide, using means well known in the art.

Examples of suitable alkyl mono- or dialkanolamide alkoxylates include fatty acid monoethanolamides alkoxylates such as isostearic acid monoethanolamide alkoxylate, lauric acid monoethanolamide alkoxylate, capric acid monoethanolamide alkoxylate, coconut fatty acid monoethanolamide alkoxylate, linoleic acid monoethanolamide alkoxylate, myristic acid monoethanolamide alkoxylate, oleic acid monoethanolamide alkoxylate, stearic acid monoethanolamide alkoxylate, oleic acid monoisopropanolamide alkoxylate, lauric acid monoethanoliamide alkoxylate, and lauric acid monoisopropanolamide alkoxylate and fatty acid diethanolamide alkoxylates such as coconut fatty acid or lauric fatty acid diethanolamide alkoxylate.

In one embodiment, the alkyl monoalkanolamide alkoxylate is coconut fatty acid or lauric acid monoethanolamide ethoxylate having an alkylene oxide content ranging from about 4 to about 10 moles, and preferably from about 5 to 8 moles. In another embodiment, the alkyl dialkanolamide alkoxylate is a coconut fatty acid or lauric acid diethanolamide ethoxylate having an alkylene oxide content ranging from about 4 to about 10 moles, and preferably from about 5 to 8 moles.

The nonionic surfactant alkoxylate suitable for use in the present invention may also be a primary or secondary fatty alcohol alkoxylate having the following formula (IV):

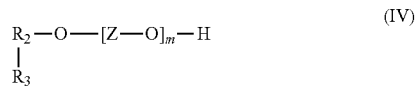

where $R_2$ is a linear or branched, saturated or unsaturated fatty hydrocarbon having from about 4 to about 16 carbon atoms; $R_3$ is the same as $R_2$ or hydrogen; and Z and m have the same meanings as defined above.

Examples of fatty alcohols suitable for use in formula (IV) include isotridecanol, isodecanol, 2-alkyl branched or partially branched alcohols; Guerbet and secondary alcohols.

In one embodiment the fatty alcohol alkoxylate and nonionic surfactant alkoxylate(s) are mixed together by means well known in the art to form the surfactant system. Preferably, the surfactant system contains from about 10-98% by weight of the fatty alcohol alkoxylate and from about 90-2% by weight of the nonionic surfactant alkoxylate, with the percent by weight being based on the total weight of the surfactant system. In another embodiment, the surfactant system contains the fatty alcohol alkoxylate and nonionic surfactant alkoxylate at levels ranging from about 30-95% by weight fatty alcohol alkoxylate and from about 70-5% by weight nonionic surfactant alkoxylate, based on the total weight of the surfactant system. In yet another embodiment, the surfactant system contains from about 40-93% by weight of the fatty alcohol alkoxylate and from about 60-7% by weight of the nonionic surfactant alkoxylate.

Liquid Surfactant Concentrate

The present invention also provides a liquid surfactant concentrate containing the surfactant system and water. Generally, surfactant blends comprising a fatty alcohol alkoxylate having an alkylene oxide content of greater than 15 moles and an actives (i.e. surfactant) content greater than 30% by weight cannot be prepared as an aqueous solution. However, it has been unexpectedly found that the fatty alcohol alkoxylate of the present invention can be combined with a nonionic surfactant alkoxylate and water to form a liquid surfactant concentrate having an actives content of greater than 30% by weight and up to 90% by weight based on the total weight of the surfactant concentrate. Thus the present invention provides a liquid surfactant concentrate that may contain greater than 50% by weight actives content, preferably greater than 60% by weight actives content, and more preferably, greater than 65% by weight actives content, based on the total weight of the liquid surfactant concentrate.

More specifically, the present invention provides a liquid surfactant concentrate containing from about 20-87% by weight fatty alcohol alkoxylate having an alkylene oxide content of about 10 to about 100 moles, 3-50% by weight nonionic surfactant alkoxylate(s) having an alkylene oxide content of about 4 to about 12 moles, and 10-70% by weight water with the percent by weight being based on the total weight of the surfactant concentrate. In another embodiment, the fatty alcohol alkoxylate, nonionic surfactant alkoxylate(s) and water form a liquid surfactant concentrate containing from about 40-70% by weight fatty alcohol alkoxylate having an alkylene oxide content of about 10 to about 100 moles, 3-25% by weight nonionic surfactant alkoxylate(s) having an alkylene oxide content of about 4 to about 12 moles, and 15-70% by weight water with the percent by weight being based on the total weight of the surfactant concentrate.

In a more specific embodiment, the liquid surfactant concentrate contains 20-25% by weight water and from about 75-80% by weight of a surfactant system consisting of a fatty alcohol ethoxylate having an ethylene oxide content of about 10 to about 60 moles and a coconut fatty acid monoethanolamide ethoxylate having an ethylene oxide of about 5 to about 10 moles, with the percent by weight being based on the total weight of the surfactant concentrate. In yet another embodiment, the liquid surfactant concentrate contains from about 30-40% by weight water and from about 60-70% by weight of a surfactant system consisting of a fatty alcohol ethoxylate having an ethylene oxide content of about 10 to about 50 moles and a coconut fatty acid monoethanolamide ethoxylate having an ethylene oxide content of between about 5 to about 8 moles, with the percent by weight being based on the total weight of the surfactant concentrate.

As noted above, the surfactant concentrates of the present invention are liquid and have the characteristic of being pourable over wide temperature ranges. The lower limit to the temperature range in which the surfactant concentrates are still liquid and pourable will vary based on the fatty alcohols and nonionic surfactants used in generating the surfactant system, and their degrees of ethoxylation.

In some instances, it may be necessary to apply heat to melt the fatty alcohol alkoxylate before it is blended with the nonionic surfactant alkoxylate and water. Thus, in one embodiment, the liquid surfactant concentrate is produced by mixing the fatty alcohol alkoxylates according to formula (I) and one or more nonionic surfactant alkoxylates according to formulas (II), (III) and (IV) with water at slightly elevated temperatures, for example, from about 40° C. to about 70° C. Alternatively, the fatty alcohol alkoxylate and nonionic surfactant alkoxylate may be mixed at a temperature ranging from about 40°-70° C. and water may be subsequently added in the required ratio with stirring at temperatures ranging from about 20° C. to about 100° C. If any loss of water should occur at these temperatures, it can be made up by addition of more water after cooling.

Once formulated, the surfactant system and/or the liquid surfactant concentrate of the present invention can be packaged in a variety of containers such as, but not limited to, steel, tin, or aluminum cans or drums, and plastic or glass bottles.

The present invention also provides for the use of the liquid surfactant concentrate in various settings. In one embodiment, the liquid surfactant concentrate is utilized as an emulsifier in a monomer emulsion during the course of producing a polymer or latex in emulsion polymerization. The liquid surfactant concentrate of the present invention may be added to the monomer emulsion at a quantity of about 0.1-10% by weight, in particular 0.5-5% by weight, and more particularly about 1-3% by weight of the total weight of the monomer emulsion. It has been surprisingly found that the liquid surfactant concentrate, when used at these amounts in a monomer emulsion, can effectively replace alkylphenol ethoxylate in emulsion polymerization and can also be rapidly biodegraded after its use.

In addition to the liquid surfactant concentrate of the present invention, the composition of the monomer emulsion further includes water, monomers, and a free radical initiator system. The monomer emulsion may also include one or more anionic surfactants, buffers, protective colloids and chain transfer agents.

To generate reproducible results, the water must be consistently pure and therefore distilled or deionized water may be used. In one embodiment, the monomer emulsion contains from 40-70% by weight water based on the total weight of the monomer emulsion. In other embodiments, the monomer emulsion may contain water in amounts from about 45-65% by weight, and preferably from about 50-60% by weight based on the total weight of the monomer emulsion.

The resultant polymer is built up from one or more free-radically polymerizable compounds or monomers. Any ethylenically unsaturated monomer that is capable of undergoing free-radical emulsion polymerization may be utilized. The ethylenically unsaturated monomer or monomers which may be polymerized or copolymerized are well known in the art. For example, suitable ethylenically unsaturated monomers are represented by, but not restricted to, mono- and polyunsaturated hydrocarbon monomers, vinyl esters (e.g., vinyl esters of $C_1$ to $C_6$ saturated monocarboxylic acids), vinyl ethers, monoethylenically unsaturated mono- and polycarboxylic acids and their alkyl esters (e.g., acrylic acid esters and methacrylic acid esters, particularly their $C_1$ to $C_{12}$ alkyl, and more particularly their $C_1$ to $C_4$ alkyl esters), the nitriles, vinyl and vinylidene halides, amides of unsaturated carboxylic acids, and amino monomers. The aforesaid monomers, particularly the acrylic acid esters and methacrylic acid esters, may be homopolymerized or copolymerized with one or more different monomers capable of addition type polymerization via a free-radical polymerization. Typical ethylenically unsaturated monomers for use include a combination of styrene and acrylic monomers, non-aromatic vinyl monomers, a combination of vinyl acetate and acrylic monomers, and solely acrylic monomers.

Generally, the monomer emulsion will contain from about 30-70% by weight monomer, preferably from about 40-60% by weight monomer and in particular, from about 40-50% by weight monomer based on the total weight of the monomer emulsion.

The free radical initiator system may include a thermal initiator which undergoes hemolytic cleavage upon heating to yield free radicals. The thermal initiator may be selected from a peroxydesulfate ion added as a potassium, ammonia or sodium salt. Other possible thermal initiators include organic peroxides, inorganic percarbonates and peracids.

In some applications, it may be desirable to prepare polymers at much lower temperatures than is possible with thermal initiators and therefore the free radical initiator system may be a redox initiator. The redox initiator may consist of one, usually inorganic, reducing agent and one inorganic or organic oxidizing agent. The reducing agent may comprise for example, alkali metal salts of sulfurous acid, such as sodium sulfite, sodium hydrogen sulfite, alkali metal salts of disulfurous acid, such as sodium disulfite, bisulfite addition compounds with aliphatic aldehydes and ketones, such as acetone bisulfite, or reducing agents such as hydroxymethanesulfinic acid and its salts, or ascorbic acid. The oxidizing agent may comprise ammonium salts and alkali metal salts of peroxodisulfuric acid, such as sodium peroxodisulfate, hydrogen peroxide, or organic peroxides, an example being tert-butyl hydroperoxide.

The free radical initiator system is generally employed in the form of an aqueous solution having a concentration ranging from 0.1-30% by weight, preferably from 0.5-20% by weight, and in particular, from 1-10% by weight based on the total weight of the aqueous solution. The amount of aqueous free radical initiator system generally used in the emulsion polymerization may range from about 0.1-10% by weight, preferably from about 0.5 to 5% by weight, and in particular, from about 1-3% by weight, based on the total weight of the monomer emulsion. It is also possible for a plurality of different initiators to be used during the emulsion polymerization.

The monomer emulsion may also include one or more anionic surfactants for adjusting the particle size of the resulting polymeric particles. The anionic surfactants are preferably selected from carboxylic acid salts, alkyl benzene sulfonates, secondary n-alkane sulfonates, alpha-olefin sulfonates, dialkyl diphenylene oxide sulfonates, sulfosuccinate esters, isoethionates, linear alcohol sulfates, linear alcohol ethoxy sulfates, phosphate esters of alcohols and alkoxylated alcohols and mixtures thereof. When present, the amount of the anionic surfactant is generally at a low concentration and within the range of from about 0.1-3% by weight of the total weight of the monomer emulsion.

Furthermore, it is possible to use chain transfer agents to regulate the molecular weight of the polymer. The most efficient chain transfer agents are halogen and sulfur compounds, especially mercaptans. The most commonly used chain transfer agents are n-dodecyl, t-butyl or t-dodecyl mercaptans, ethylhexyl thioglycolate, mercaptoethanol, mercaptopropyltrimethosysilane and aromatic hydrocarbons with activated hydrogens such as toluene. The amount of chain transfer agent included in the monomer emulsion may range from about 0.02-1% by weight of the total weight of the monomer emulsion.

Another component which may be added to the monomer emulsion to provide enhanced stability is a protective colloid. The protective colloid may be a high-molecular weight water-soluble material such as polyvinyl alcohol, methyl cellulose, sodium algenate, hydroxy-ethyl cellulose, etc. When present, the monomer emulsion may contain from about 0.02-1% by weight of the protective colloid based on the total weight of the monomer emulsion.

Moreover, it may be necessary to control the pH before, during or after polymerization, in which case a buffer may be added to the monomer emulsion. Buffers which may be used include low molecular weight, organic or inorganic buffering materials generally used by those skilled in the art. Useful inorganic buffers include the alkali metal carbonates and alkali metal phosphates, e.g., sodium carbonate, sodium polyphosphate and sodium acetate. Useful organic acids are citric acid and acetic acid. When present, the buffer is generally at a level of about 0.1-3% by weight of the total weight of the monomer emulsion.

The polymers may be prepared by first charging water and some portion of the monomer emulsion to a heatable and coolable reaction vessel equipped with a stirrer, a thermometer and a reflux condenser. The emulsion polymerization generally takes place at temperatures ranging from about 30°-125° C., preferably from about 50°-90° C., for a period ranging from about 30 minutes to several hours.

The emulsion polymerization can be conducted either as a batch process or in the form of a feed process, including staged or gradient procedures. Preference is given to the feed process, in which a portion of the emulsion polymerization blend is introduced as an initial charge, heated to the polymerization temperature and subjected to initial polymerization, and then the remainder of the emulsion polymerization blend, usually by way of two or more spatially separate feed streams, of which one or more comprise the monomers, is supplied continuously, in stages or with superimposition of a concentration gradient to the polymerization zone, during which the polymerization is maintained. The way in which the free radical initiator system is added to the polymerization vessel in the course of the free-radical aqueous emulsion polymerization is familiar to those skilled in the art. It can either be included entirely in the initial charge to the polymerization vessel or else introduced in the course of the free-radical aqueous emulsion polymerization, continuously or in stages, at the rate at which it is consumed. In each individual case this will depend both on the chemical nature of the free radical initiator system and on the polymerization temperature. Preferably, one portion is included in the initial charge and the remainder is supplied to the polymerization zone at the rate at which it is consumed.

Thus, in one embodiment, the initial charge of monomer emulsion is heated with stirring under a nitrogen blanket to a temperature of from about 55°-125° C. After the initial charge has reached a temperature sufficient to initiate polymerization, the monomer emulsion or balance of the monomer emulsion is charged to the reaction vessel over a period of 15 minutes to 4 hours while maintaining the reaction at the desired reaction temperature. A series of aliquots of free radial initiator system are charged to the reaction simultaneously. Typically the initiator system is charged to the reaction and followed by a hold period to allow for reaction to occur before adding the next initiator amount. After the final free radical initiator amount is added, the batch is held for 30 minutes to 4 hours to fully decompose all initiator and drive the reaction to completeness.

In another embodiment, the emulsion polymerization is carried out in a batch process whereby the emulsion polymers are prepared by charging the monomer emulsion containing water, monomer, liquid surfactant concentrate, free radical initiator system and chain transfer agent, as appropriate, to a reaction vessel with stirring under a nitrogen blanket. The monomer emulsion is heated to a temperature of from about 55°-125° C. to carry out polymerization. After 30 minutes to 4 hours at this temperature, a series of additional aliquots of free radical initiator are charged to the reaction vessel, followed by a hold period to allow for reaction to occur before adding the next amount of initiator. After the final initiator amount is added, the batch is held for an additional 30 minutes to 4 hours to fully decompose all initiator and drive the reaction to completeness.

The emulsion polymerization leads to aqueous polymer dispersions which generally contain solids contents of from about 15-75% by weight, preferably from about 40-75% by weight based on the total weight of the polymer dispersion. The resultant polymer dispersion is stable even when the liquid surfactant concentrate content is low. Coagulum is present only in minor amounts.

In addition to the use in emulsion polymerization, the liquid surfactant concentrates of the present invention are suitable for use in agrochemical formulations. For example, the liquid surfactant concentrate may be used for enhancing the efficacy of active ingredients, such as an insecticide, fungicide, bactericide, insecticide, insect antifeedant, acaricides, miticide, nematocide, herbicide or plant growth regulator compositions or the like in an agrochemical formulation.

The liquid surfactant concentrates may also be used in other types of formulations including personal care products and fabric conditioners and defoamers. The liquid surfactant concentrates of the current invention are also useful as emulsifiers for wax, silicone and polymer emulsions used in, for example, polishes and textile treatment formulations. The liquid surfactant concentrates may further be used as emulsifiers for solvents used in industrial and institutional cleaning formulations, where they have benefits as fugitive surfactants, that is surfactants which complete their action and are then readily degraded with loss of surfactancy.

A) Preparation of Liquid Surfactant Concentrates

EXAMPLE 1

A fatty alcohol mixture containing 0-2% by weight n-decanol ($C_{10}$), 65-72% by weight lauric alcohol ($C_{12}$), 24-30% by weight myristic alcohol ($C_{14}$) and 0-6% by weight cetyl alcohol ($C_{16}$) was reacted in a known manner with various molar quantities of ethylene oxide (Tables 1-3). The fatty alcohol ethoxylate products obtained were melted at 65° C. A coconut fatty acid monoethanolamide ethoxylate (referred to here as a "cocamide ethoxylate"), which had been prepared by reacting in a known manner coconut fatty acid monoethanolamide with 5.5 moles of ethylene oxide, was added with stirring to the molten fatty alcohol ethoxylate product in various quantities to form a surfactant system.

The surfactant systems were then converted with water at a temperature of 65° C. to liquid surfactant concentrates which differed in the composition of the surfactant system and in the total actives content of 65% and 80% by weight based on the total weight of the surfactant concentrate. Water was added to a certain quantity of the surfactant system in a quantity sufficient to give 100 g of surfactant concentrate. After cooling to room temperature, any water lost was replaced. Table's 1-3 further show the liquid surfactant concentrates set points (i.e. the temperature above which the surfactant concentrates are liquids).

TABLE 1

| Surfactant Concentrate | Fatty Alcohol Ethoxylate 12EO (wt. %) | Cocamide Ethoxylate 5.5EO (wt. %) | Water (wt. %) | Set Point (° C.) |
| --- | --- | --- | --- | --- |
| 1 | 72 | 8 | 20 | <15 |
| 2 | 64 | 16 | 20 | <15 |
| 3 | 56 | 24 | 20 | <15 |
| 4 | 48 | 32 | 20 | <15 |
| 5 | 40 | 40 | 20 | <10 |

TABLE 2

| Surfactant Concentrate | Fatty Alcohol Ethoxylate 30EO (wt. %) | Cocamide Ethoxylate 5.5EO (wt. %) | Water (wt. %) | Set Point (° C.) |
| --- | --- | --- | --- | --- |
| 6 | 58.5 | 6.5 | 35 | <15 |
| 7 | 52 | 13 | 35 | <10 |
| 8 | 48.45 | 16.25 | 35 | <10 |
| 9 | 45.5 | 19.5 | 35 | <5 |
| 10 | 39 | 26 | 35 | <5 |
| 11 | 32.5 | 32.5 | 35 | <0 |

TABLE 3

| Surfactant Concentrate | Fatty Alcohol Ethoxylate 50EO (wt. %) | Cocamide Ethoxylate 5.5EO (wt. %) | Water (wt. %) | Set Point (° C.) |
| --- | --- | --- | --- | --- |
| 12 | 58.5 | 6.5 | 35 | <15 |
| 13 | 52 | 13 | 35 | <10 |
| 14 | 45.5 | 19.5 | 35 | <10 |
| 15 | 39 | 26 | 35 | <5 |
| 16 | 32.5 | 32.5 | 35 | <5 |

EXAMPLE 2

The fatty alcohol mixture of Example 1 containing n-decanol, lauric alcohol, myristic alcohol and cetyl alcohol was reacted in a known manner with 30 moles of ethylene oxide to form a fatty alcohol ethoxylate. The fatty alcohol ethoxylate was melted at 75° C. and 70 parts of this ethoxylate was added with stirring to 30 parts of a branched fatty alcohol ethoxylate, which had been prepared by reacting in a known manner isotridecanol with 8 moles of ethylene oxide. This surfactant system was subsequently converted with water at 65° C. into a liquid surfactant concentrate containing 70% by weight actives based on the total weight of the surfactant concentrate. The liquid surfactant concentrate was a thin mobile liquid at room temperature with a set point of 15° C.

EXAMPLE 3

Example 2 was repeated but the isotridecanol was replaced with equal parts of another branched fatty alcohol ethoxylate which was prepared by reacting in a known manner isodecanol with 7.5 moles ethylene oxide. The liquid surfactant concentrate was a thin mobile liquid at room temperature with a set point of 11° C.

EXAMPLE 4

Example 2 was repeated but the isotridecanol was replaced with equal parts of a partially branched fatty alcohol ethoxylate which was prepared by reacting in a known manner DOBANOL 91 alcohol (Shell) with 8 moles ethylene oxide. The liquid surfactant concentrate was a thin mobile liquid at room temperature with a set point of 8° C.

EXAMPLE 5

Example 2 was repeated but the isotridecanol was replaced with a partially branched fatty alcohol ethoxylate which was prepared by reacting in a known manner LIAL® 125 alcohol (Sasol Ltd.) with 5 moles ethylene oxide. The ratio of the fatty alcohol ethoxylate (30EO) to the LIAL® 125 alcohol ethoxylate (5EO) was 92.5 to 7.5. After being converted with water at 65° C. into a liquid concentrate containing 65% by weight actives based on the total weight of the surfactant concentrate, the liquid surfactant concentrate was a thin mobile liquid at room temperature.

COMPARATIVE EXAMPLE 6

The fatty alcohol mixture of Example 1 containing n-decanol, lauric alcohol, myristic alcohol and cetyl alcohol was reacted in a known manner with 30, 40 and 50 moles of ethylene oxide to form fatty alcohol ethoxylates. The fatty alcohol ethoxylates were melted at a temperature within the range from 40-70° C. and fully deionized water was added to form surfactant solutions containing 50-80% by weight actives based on the total weight of the surfactant concentrate. All of the surfactant solutions were gel-like or solid at room temperatures.

COMPARATIVE EXAMPLE 7

The fatty alcohol mixture of Example 1 containing n-decanol, lauric alcohol, myristic alcohol and cetyl alcohol was reacted in a known manner with 30 moles of ethylene oxide to form a fatty alcohol ethoxylate. The fatty alcohol ethoxylate, which contained 0.68% by weight polyethylene glycol (PEG), was further mixed with PEG (molecular weight of 2000) at 65° C. to form surfactant mixtures containing approximately 2, 6, 8, 8, 10, 12, 14, 16, 18, 20, 22 and 25 wt. % PEG based on the total weight of the mixture. Fully deionized water was added to the resulting surfactant mixtures at this temperature to form surfactant solutions containing 50-80% by weight actives based on the total weight of the surfactant concentrate. All of the surfactant solutions were gel-like or solid at room temperatures.

EXAMPLE 8

Different surfactant systems of higher ethoxylates were prepared by the same method used in Example 1. These surfactant systems were subsequently converted with water at 55° C. into liquid surfactant concentrates containing 65% by weight actives based on the total weight of the surfactant concentrate. Tables 4-5 further show the composition of each system, and their liquid surfactant concentrate set points.

TABLE 4

| System 1 | Fatty Alcohol Ethoxylate 50EO = 70 wt % | Cocamide Ethoxylate 5.5EO = 30 wt % |
|---|---|---|
| System 2 | Fatty Alcohol Ethoxylate 50EO = 70 wt % | Alcohol Ethoxylate 8.0EO = 30 wt % |
| System 3 | Fatty Alcohol Ethoxylate 50EO = 70 wt % | Alcohol Ethoxylate 7.5EO = 30 wt % |

TABLE 5

| Surfactant Concentrate | System at 65 wt % in Water | Set Point (° C.) |
|---|---|---|
| 17 | System 1 | 7.5 |
| 18 | System 2 | 6.3 |
| 19 | System 3 | 3.4 |

B) Use of Liquid Surfactant Concentrate as an Emulsifier for Emulsion Polymerization

EXAMPLE 9

Various nonionic surfactants were tested for their suitability as emulsifiers for emulsion polymerization. The emulsion polymerization was carried out according to the following procedure:

527.5 g of deionized water, 10 g of sodium alkyl sulfate (containing 20% actives) and 10 g of either (i) a liquid surfactant concentrate according to the present invention; (ii) an alkylphenol alkoxylate; or (iii) a linear fatty alcohol alkoxylate were mixed to form an initial reactor charge (IRC). 140 g of ethyl acrylate, 140 g of methyl methacrylate, 52.5 g of n-butyl acrylate and 17.5 g of acrylic acid were mixed to form a monomer blend (MB). 100 g of a free radical initiator system (IS) was then formed containing 2% by wt. potassium persulfate based on the total weight of the free radical initiator system.

The IRC was charged to a reactor and the reactor flushed with nitrogen. 5% by wt. of the total amount of the MB was then added to the reactor and the reactor was heated to 65° C. 10% by wt. of the total amount of the IS was then added to the reactor and the reactor was heated to 75° C. The MB and IS were then added simultaneously to the reactor over approximately a 2 hour time period while the reactor temperature was held at 75° C. The contents of the reactor were post-polymerized for 1 hour at 80° C. The resulting polymer dispersion was cooled to 40° C. and discharged from the reactor.

The polymer dispersion obtained was then filtered through a piece of nylon cloth and the quantity of grit, which is the amount of solids remaining in the cloth after filtering plus the amount of solids collected from the reaction vessel after the total solids had been dried overnight at 40° C., was measured. The percent grit was calculated by dividing the weight of the grit by the total theoretical weight of the polymer dispersion. The particle size of the polymer dispersion was also measured using a Beckman Coulter particle size analyzer in accordance with the standard procedure for operating such equipment. The results for the various polymer dispersions are shown below in Table 6.

TABLE 6

| Polymer Dispersion | Nonionic Surfactant | Grit (% by wt solids based on total weight of polymer dispersion) | Particle Size (nm) |
|---|---|---|---|
| 1 | Surfactant Concentrate 9 of Example 1 | 0.073 | 120 |
| 2 | Surfactant Concentrate 14 of Example 1 | 0.062 | 120 |
| 3 | Surfactant Concentrate 3 of Example 1 | 0.042 | 120 |
| 4 | Surfactant Concentrate of Example 2 | 0.113 | 120 |
| 5 | Nonylphenol 35EO | 0.173 | 120 |
| 6 | Nonylphenol 20EO | 0.138 | 120 |
| 7 | Nonylphenol 30EO | 0.108 | 120 |
| 8 | Competitor Product 1* | 0.097 | 120 |
| 9 | Competitor Product 2* | 0.129 | 120 |

*Ethoxylated linear fatty alcohols

The results show that the surfactant concentrates according to the present invention stabilize the emulsions excellently during polymerization.

EXAMPLE 10

Various nonionic surfactants were tested to determine their suitability as emulsifiers in emulsion polymerization. Styrene acrylic polymer dispersions were prepared according to the following procedure:

Approximately 20 g of a 65% active ingredients (65% AI) nonionic surfactant was prepared containing either (i) a liquid surfactant concentrate according to the present invention; (ii) an alkylphenol ethoxylate; (iii) a modified fatty alcohol polyetherglycol; or (iv) a secondary alcohol ethoxylate. 0.57 g of the 65% AI nonionic surfactant was added to 194.2 g of deionized water to form an initial reactor charge (IRC). Next, 223.2 g of deionized water, 12.1 g of sodium alkyl sulfate (20% actives) and 18.7 g of 65% AI nonionic surfactant were mixed to form a surfactant mixture (SM). A monomer blend (MB) was then prepared by mixing 228.7 g of stryrene, 228.8 g of n-butyl acrylate, 27 g of methyl methacrylate and 4.85 g of methacrylic acid. Finally, a free radical initiator system (IS) containing 59.8 g of deionized water and 2.43 g of ammonium persulfate was prepared.

The IRC was charged to a reactor and the reactor was flushed with nitrogen then heated to 80° C. A monomer premix was then prepared by adding the MB to the SM while stirring. 5% by weight of the total amount of the monomer premix and 20% by weight of the total amount of the IS was then added to the reactor and held at 80° C. for 15 minutes. The remaining monomer premix and IS was subsequently added to the reactor over approximately a 3 hour time period at a temperature of 80° C. The contents of the reactor were post-polymerized for ½ hour at 85° C. The resulting polymer dispersions containing approximately 48-50% solids, were cooled to 40° C. and discharged from the reactor and the pH adjusted to approximately 7-9.

The grit and particle sizes of the polymer dispersions were then determined according to Example 8. In addition, viscosity was determined using a Brookfield viscometer. The electrolyte stability was measured by thoroughly mixing equal weights of the polymer dispersion and either a 2.5% by wt. Borax solution or a 5% by wt. calcium chloride solution and allowed to sit at room temperature and the stability of the solution assessed after 24 hours. Freeze/Thaw stability of the polymer dispersions was also determined by freezing the polymer dispersion at a temperature of −5° C. and holding it at that temperature for 20 hours then allowing the frozen dispersion to thaw at room temperature of 24 hours and recording the number of cycles repeated. Monomer conversion was determined by the well known bromine titration method while the storage stability was determined by exposing the polymer dispersion to a constant temperature of 50° C. for 8 weeks and measuring the grit, pH and viscosity after exposure and comparing it to those of the original. Finally, water absorption was determined by applying a 200 μm wet-film to a polyethylene film and allowing the film to dry for 7 days at 40° C. A 2×2 cm square was then cut and immersed in deionized water for 14 days at room temperature. The square was then removed, dried with a tissue and the percentage increase in weight measured. The results are shown below in Table 7.

The results demonstrate the liquid surfactant concentrates of the present invention can be effectively used as emulsifiers in the preparation of styrene-acrylic latex.

EXAMPLE 11

Various nonionic surfactants were tested to determine their suitability as emulsifiers in emulsion polymerization. All acrylic polymer dispersions were prepared according to the procedure of Example 9 with the exception that the monomer blend (MB) contained 239.7 g of methyl methacrylate, 239.7 g of n-butyl acrylate and 4.9 g of methyl methacrylic acid.

The wet scrub resistance of the polymer dispersions was determined according to ISO 11998, which is incorporated herein by reference. The results are shown below in Table 8.

TABLE 8

| Property | Polymer Dispersion 15 | Polymer Dispersion 16 |
|---|---|---|
| 65% AI Nonionic Surfactant | Surfactant Conc. 9 of Example 1 | Nonylphenol 30EO |
| Particle Size (nm) | 165 | 138 |
| Electrolyte Stability | | |
| 2.5% Borax | Pass | Pass |
| 5% CaCl$_2$ | Pass | Pass |
| Freeze/Thaw Stability | 5 cycles | 5 cycles |
| Original Stability | | |
| Grit (%) | 0.477 | 0.480 |
| pH | 8.96 | 8.77 |
| visc. (mPa s) LV3/30/@20° C. | 66 | 78 |

TABLE 7

| Property | Polymer Dispersion 10 | Polymer Dispersion 11 | Polymer Dispersion 12 | Polymer Dispersion 13 | Polymer Dispersion 14 |
|---|---|---|---|---|---|
| 65% AI Nonionic Surfactant | Surfactant Conc. 9 of Example 1 | Surfactant Conc. 8 of Example 1 | Nonylphenol 30EO | Competitor Product 3* | Competitor Product 4** |
| Particle Size (nm) | 172 | 151 | 147 | 134 | 140 |
| Electrolyte Stability | | | | | |
| 2.5% Borax | Pass | Pass | Pass | Pass | Pass |
| 5% CaCl$_2$ | Pass | Pass | Pass | Pass | Pass |
| Freeze/Thaw Stability | 5 cycles | 5 cycles | 5 cycles | 5 cycles | 5 cycles |
| Original Stability | | | | | |
| Grit (%) | 0.237 | 0.214 | 0.206 | 0.206 | 0.240 |
| pH | 7.27 | 9.59 | 8.37 | 9.60 | 9.05 |
| visc. (mPa s) LV3/30/@20° C. | 70 | 74 | 74 | 64 | 72 |
| Storage Stability at 8 weeks | | | | | |
| Grit (%) | 0 | 0 | 0 | 0 | 0 |
| pH | 5.32 | 8.73 | 6.92 | 8.44 | 8.39 |
| visc. (mPa s) LV3/30/@20° C. | 30 | 44 | 30 | 40 | 44 |
| Water Absorption (%) | 2.235 | 2.173 | 2.202 | 2.229 | |

*Modified fatty alcohol polyetherglycol
**Secondary alcohol ethoxylate

TABLE 8-continued

| Property | Polymer Dispersion 15 | Polymer Dispersion 16 |
|---|---|---|
| Storage Stability at 8 weeks | | |
| Grit (%) | 0 | 0 |
| pH | 8.45 | 8.25 |
| visc. (mPa s) LV3/30/@20° C. | 34 | 52 |
| Water Absorption (%) | 2.544 | 2.640 |
| Wet Scrub Resistance Wt. loss (g/m$^2$) | 0.736 | 1.135 |

The results demonstrate the liquid surfactant concentrates of the present invention can be used as emulsifiers to prepare an all acrylics latex having comparable performance properties to those prepared using a nonylphenol 30EO emulsifier.

Although making and using various embodiments of the present invention have been described in detail above, the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. A liquid surfactant concentrate comprising:
   (i) about 20-87% by weight of a primary or secondary fatty alcohol alkoxylate of formula (I):

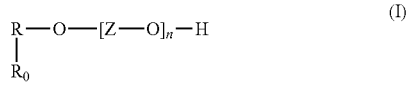
   (I)

(ii) about 3-50% by weight of a nonionic surfactant alkoxylate selected from the group consisting of coconut fatty acid monoethanolamide ethoxylate and lauric fatty acid monoethanolamide ethoxylate; and
   (iii) about 10-40% by weight water;
   wherein the percent by weight is based on the total weight of the fatty alcohol alkoxylate plus nonionic surfactant alkoxylate plus water and wherein R is a linear or branched, saturated or unsaturated hydrocarbon group having from about 6 to about 24 carbon atoms; $R_0$ is the same as R or hydrogen; Z is ethylene; and n is the ethylene oxide content ranging from about 10 to about 100 moles.

2. The liquid surfactant concentrate of claim 1 comprising about 40-70% by weight of the fatty alcohol alkoxylate, about 3-25% by weight of the nonionic surfactant alkoxylate and about 15-40% by weight water.

3. The liquid surfactant concentrate of claim 1 wherein R is a mixture of linear saturated hydrocarbon groups containing from about 10-18 carbon atoms.

4. The liquid surfactant concentrate of claim 1 wherein R is a mixture of linear saturated hydrocarbon groups containing from about 12-16 carbon atoms.

5. A method for making a liquid surfactant concentrate according to claim 1 comprising the step of blending the fatty alcohol alkoxylate with the nonionic surfactant alkoxylate and water at a temperature ranging from about 40° C. to about 70° C.

6. An article comprising a liquid surfactant concentrate according to claim 1 and a container.

7. A method of making a monomer emulsion comprising the steps of contacting:
   (a) a liquid surfactant concentrate comprising:
      (i) about 40-70% by weight of a primary or secondary fatty alcohol alkoxylate of formula (I):

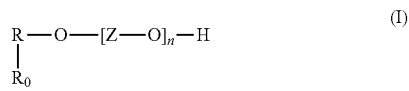
      (I)

(ii) about 3-25% by weight of at least one nonionic surfactant alkoxylate of formulas (II), (III) and (IV)

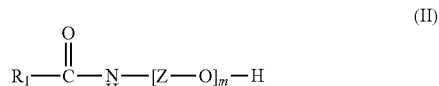
      (II)

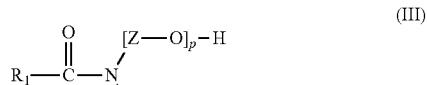
      (III)

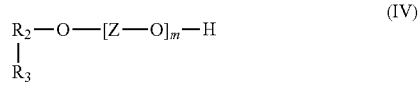
      (IV)

(iii) about 15-40% by weight water;
      wherein the percent by weight is based on the total weight of the fatty alcohol alkoxylate plus nonionic surfactant alkoxylate plus water and wherein R is a linear or branched, saturated or unsaturated hydrocarbon group having from about 6 to 24 carbon atoms; $R_0$ is the same as R or hydrogen; Z is ethylene; n is the ethylene oxide content ranging from about 30 to about 60 moles; $R_1$ is a fatty acid hydrocarbon chain containing from about 5 to about 21 carbon atoms; m and p+q are the alkylene oxide contents ranging from about 4 to about 12 moles; $R_2$ is a linear or branched, saturated or unsaturated fatty hydrocarbon having from about 4 to about 16 carbon atoms; and $R_3$ is the same as $R_2$ or hydrogen;
   (b) deionized water;
   (c) a free radical initiator system; and
   (d) one or more ethylenically unsaturated monomers.

8. A stable polymer formed by the monomer emulsion according to claim 7.

9. A liquid surfactant concentrate comprising:
   (i) about 20-87% by weight of a primary or secondary fatty alcohol alkoxylate of formula (I):

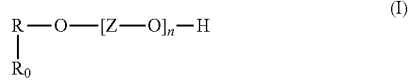
   (I)

(ii) about 3-50% by weight of at least one nonionic surfactant alkoxylate of formulas (II), (III) and (IV)

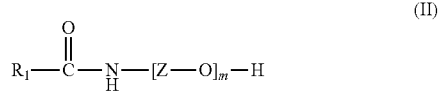
   (II)

-continued

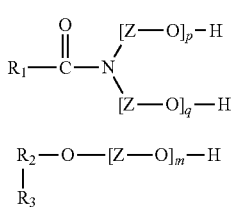

(iii) about 30-40% by weight water;
wherein the percent by weight is based on the total weight of the fatty alcohol alkoxylate plus nonionic surfactant alkoxylate plus water and wherein R is a linear or branched, saturated or unsaturated hydrocarbon group having from about 6 to about 24 carbon atoms; $R_0$ is the same as R or hydrogen; Z is an alkylene group having 2 to 4 carbon atoms; n is the alkylene oxide content ranging from about 10 to about 100 moles; $R_1$ is a fatty acid hydrocarbon chain containing from about 5 to about 21 carbon atoms; m and p+q are alkylene oxide contents ranging from about 4 to about 12 moles; $R_2$ is a linear or branched, saturated or unsaturated fatty hydrocarbon having from about 4 to about 16 carbon atoms; and $R_3$ is the same as $R_2$ or hydrogen; and
wherein about 60-70% by weight of the liquid surfactant concentrate comprises the fatty alcohol alkoxylate and the nonionic surfactant alkoxylate.

10. A liquid surfactant concentrate comprising:
(i) about 20-87% by weight of a primary or secondary fatty alcohol alkoxylate of formula (I):

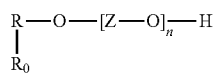

(ii) about 3-50% by weight of at least one nonionic surfactant alkoxylate of formulas (II), (III) and (IV)

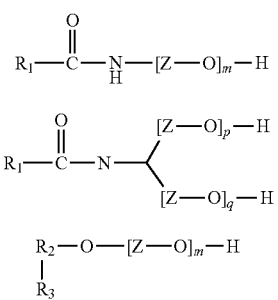

(iii) about 20-25% by weight water;
wherein the percent by weight is based on the total weight of the fatty alcohol alkoxylate plus nonionic surfactant alkoxylate plus water and wherein R is a linear or branched, saturated or unsaturated hydrocarbon group having from about 6 to about 24 carbon atoms; $R_0$ is the same as R or hydrogen; Z is an alkylene group having 2 to 4 carbon atoms; n is the alkylene oxide content ranging from about 10 to about 100 moles; $R_1$ is a fatty acid hydrocarbon chain containing from about 5 to about 21 carbon atoms; m and p+q are alkylene oxide contents ranging from about 4 to about 12 moles; $R_2$ is a linear or branched, saturated or unsaturated fatty hydrocarbon having from about 4 to about 16 carbon atoms; and $R_3$ is the same as $R_2$ or hydrogen; and
wherein about 75-80% by weight of the liquid surfactant concentrate comprises the fatty alcohol alkoxylate and the nonionic surfactant alkoxylate.

11. The liquid surfactant concentrate of claim 1 wherein n ranges from about 12 to about 70 moles.

12. A liquid surfactant concentrate comprising:
(i) about 20-87% by weight of a primary or secondary fatty alcohol alkoxylate of formula (I):

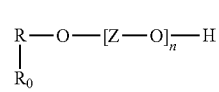

(ii) about 3-50% by weight of at least one nonionic surfactant alkoxylate of formulas (II), (III) and (IV)

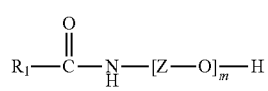

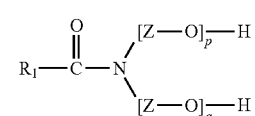

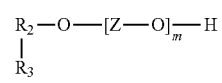

(iii) about 10-40% by weight water;
wherein the percent by weight is based on the total weight of the fatty alcohol alkoxylate plus nonionic surfactant alkoxylate plus water and wherein R is a linear or branched, saturated or unsaturated hydrocarbon group having from about 6 to about 24 carbon atoms; $R_0$ is the same as R or hydrogen; Z is ethylene ewe and n ranges from about 30 to about 60 moles; $R_1$ is a fatty acid hydrocarbon chain containing from about 5 to about 21 carbon atoms; m and p+q are ethylene oxide contents ranging from about 4 to about 12 moles; $R_2$ is a linear or branched, saturated or unsaturated fatty hydrocarbon having from about 4 to about 16 carbon atoms; and $R_3$ is the same as $R_2$ or hydrogen.

13. The liquid surfactant concentrate of claim 12, comprising about 40-70% by weight of the fatty alcohol alkoxylate, 3-25% by weight of the nonionic surfactant alkoxylate and 15-40% by weight water.

14. The liquid surfactant concentrate of claim 13, wherein R is a mixture of linear saturated hydrocarbon groups containing from about 12-16 carbon atoms.

15. A liquid surfactant concentrate comprising:

(i) about 20-87% by weight of a primary or secondary fatty alcohol alkoxylate of formula (I):

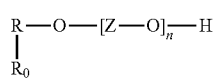
(I)

(ii) about 3-50% by weight of at least one nonionic surfactant alkoxylate of formulas (II) and (III):

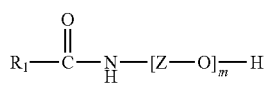
(II)

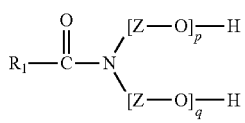
(III)

(iii) about 10-40% by weight water;

wherein the percent by weight is based on the total weight of the fatty alcohol alkoxylate plus nonionic surfactant alkoxylate plus water and wherein R is a linear or branched, saturated or unsaturated hydrocarbon group having from about 6 to about 24 carbon atoms; $R_0$ is the same as R or hydrogen; Z is an alkylene group having 2 to 4 carbon atoms; n is the alkylene oxide content ranging from about 10 to about 100 moles; $R_1$ is a fatty acid hydrocarbon chain containing from about 5 to about 21 carbon atoms; and m and p+q are alkylene oxide contents ranging from about 4 to about 12 moles.

16. A method of making a monomer emulsion comprising the steps of contacting:

(a) a liquid surfactant concentrate comprising:

(i) about 20-87% by weight of a primary or secondary fatty alcohol alkoxylate of formula (I):

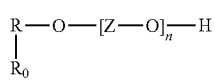
(I)

(ii) about 3-50% by weight of at least one nonionic surfactant alkoxylate of formulas (II) and (III)

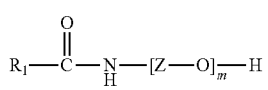
(II)

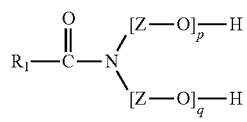
(III)

(iii) about 10-40% by weight water;

wherein the percent by weight is based on the total weight of the fatty alcohol alkoxylate plus nonionic surfactant alkoxylate plus water and wherein R is a linear or branched, saturated or unsaturated hydrocarbon group having from about 6 to 24 carbon atoms; $R_0$ is the same as R or hydrogen; Z is an alkylene group having 2 to 4 carbon atoms; n is the alkylene oxide content ranging from about 10 to about 100 moles; $R_1$ is a fatty acid hydrocarbon chain containing from about 5 to about 21 carbon atoms; and m and p+q are the alkylene oxide contents ranging from about 4 to about 12 moles;

(b) deionized water;
(c) a free radical initiator system; and
(d) one or more ethylenically unsaturated monomers.

* * * * *